(12) United States Patent
Jacob

(10) Patent No.: US 6,234,908 B1
(45) Date of Patent: May 22, 2001

(54) DRIVE ASSEMBLY WITH AT LEAST ONE CONSTANT VELOCITY FIXED JOINT HAVING A SET OF ROLLING CONTACT MEMBER GUIDING MEANS

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/350,312

(22) Filed: Jul. 9, 1999

(30) Foreign Application Priority Data

Jul. 10, 1998 (DE) .............................................. 198 31 010

(51) Int. Cl.⁷ ...................................................... F16D 3/16
(52) U.S. Cl. ............................................ 464/140; 464/906
(58) Field of Search .................................. 464/140, 141, 464/145, 906, 167; 29/898.067

(56) References Cited

U.S. PATENT DOCUMENTS

| | | | |
|---|---|---|---|
| 1,622,425 | * 3/1927 | Dwyer | 464/141 |
| 2,949,022 | * 8/1960 | Leon | 464/145 X |
| 4,950,206 | * 8/1990 | Jacob | 464/140 |
| 5,221,233 | 6/1993 | Jacob . | |
| 5,242,329 | * 9/1993 | Jacob | 464/145 |
| 5,410,902 | * 5/1995 | Jacob | 29/898.067 |
| 5,611,733 | 3/1997 | Jacob et al. . | |
| 5,618,235 | 4/1997 | Krude et al. . | |
| 5,624,318 | * 4/1997 | Jacob et al. | 464/140 |
| 5,647,801 | 7/1997 | Jacob . | |

FOREIGN PATENT DOCUMENTS

| | | |
|---|---|---|
| 4031820 C2 | 4/1992 | (DE) . |
| 4419373 A1 | 12/1995 | (DE) . |
| 945901 | * 1/1964 | (GB) .................................. 464/140 |
| 2 289 929 | 12/1995 | (GB) . |
| 2 311 117 | 9/1997 | (GB) . |

\* cited by examiner

*Primary Examiner*—Lynne H. Browne
*Assistant Examiner*—Greg Binda

(57) ABSTRACT

The invention relates to a drive assembly comprising a constant velocity fixed joint A and rolling contact member guide B. The constant velocity fixed joint A is designed in such a way that its outer part 1 and its inner part 3, for the purpose of guiding the balls 5, are provided with two outer running grooves 14, 15 alternately extending from two opposed open ends 10, 11 in distributed planes in an undercut-free way and, opposite thereto, two inner running grooves 17, 18. The cage arranged between the inner part 3 and the outer part 1 for the purpose of guiding the balls 5 is guided by a hollow-spherical portion of its inner face 21 on the spherical outer face 19 of the inner part 3. The rolling contact member guide B connected to the inner part 3 comprises a plunging journal 33 which enters a bore 39 in the plunging sleeve 38. The plunging journal 33 and the plunging sleeve 38 comprise opposed inner grooves 37 and outer grooves 40 respectively in which guiding balls 41 are adjustably held by guiding cage 42 along with setting axis 35. By combining a constant velocity fixed joint A comprising running grooves extending in opposite directions with rolling contact member guide B, it is possible to provide a drive assembly for transmitting torque, which has a long service life, even at high rotational speeds and large articulation angles.

12 Claims, 3 Drawing Sheets

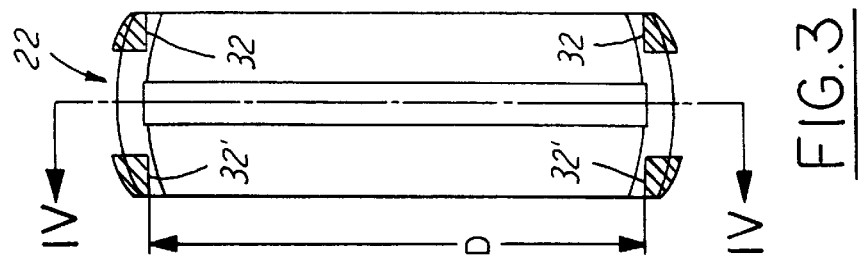
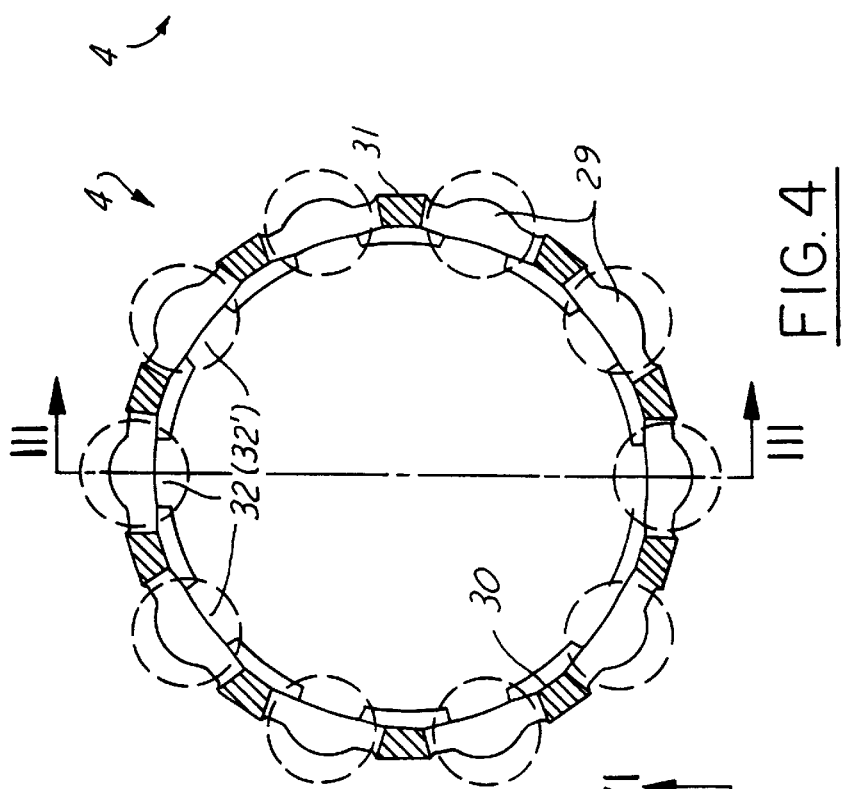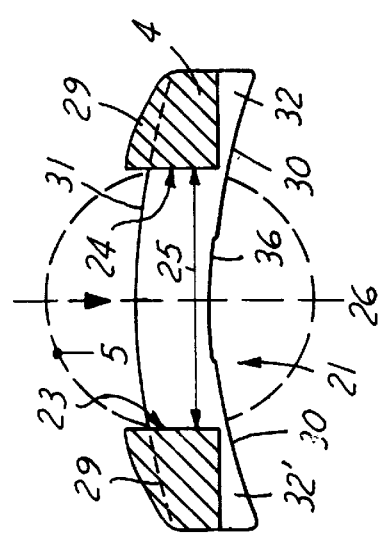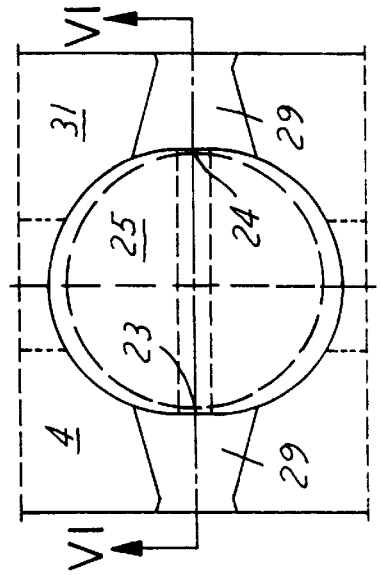

DRIVE ASSEMBLY WITH AT LEAST ONE CONSTANT VELOCITY FIXED JOINT HAVING A SET OF ROLLING CONTACT MEMBER GUIDING MEANS

BACKGROUND OF THE INVENTION

The invention relates to a drive assembly with at least one constant velocity fixed joint and a set of rolling contact member guiding means.

Such constant velocity fixed joints comprise a hollow outer part, an inner part with an outer face received in the outer part, a cage arranged between the outer part and inner part and balls which are held by the cage in a common plane and which engage running grooves in an inner face of the hollow outer part and in the outer face of the inner part for the purpose of transmitting torque between the outer part and inner part. The outer part and the inner part only permit angular movements relative to one another around the articulation center. The rolling contact member guiding means allow the transmission of torque in the case of a setting movement along a setting axis. To achieve this objective, the rolling contact member guiding means comprise a plunging journal with inner grooves extending in the outer face of same parallel to the setting axis, as well as a plunging sleeve with a bore which is adjustably entered by the plunging journal with inner grooves extending in the outer face of same parallel to the setting axis. Also included is a plunging sleeve with a bore which is adjustably entered by the plunging journal along the setting axis. In the bore of the plunging sleeve, the inner grooves are arranged opposite outer grooves and extend parallel to the setting axis. Furthermore, there are provided guiding balls which are arranged in the respective opposed pairs of inner and outer groves. The guiding balls are held in a guiding cage.

Such an assembly is described in DE 44 19 373 A1. The plunging journal of the rolling contact member guiding means is produced so as to be integral with the inner part of the constant velocity joint. The inner part of the constant velocity fixed joint, in its outer face, is provided with inner running grooves which extend in an undercut-free way from a first open end of the outer part. Said inner running grooves are arranged opposite outer running grooves in the outer part which also start from the first open end in an undercut-free way. Furthermore, the cage is guided by means of a spherical inner face on a spherical outer face of the inner part. The inner part comprises a control face in the form of a hollow ball on which there is supported a control element with a spherical outer face. The control element itself is supported on a face of the supporting element which, in turn, is secured in the outer part. Between the outer face of the cage and the inner face of the outer part there is provided a distance. In the axial direction, the inner part is held and centered relative to the outer part by the balls and by the shape of the inner running grooves and outer running grooves on the one hand and by the control element in connection with the supporting element in the outer part on the other hand.

Such joints are mostly used in motor vehicles for transporting passengers or in delivery vans.

In the case of rear wheel drive vehicles or four wheel drive vehicles, the front gearbox output is connected to the rear axle drive by a propeller shaft. Especially in passenger cars with a rear wheel drive only, such propeller shafts rotate at high speeds up to 10,000 revolutions per minute. Such a propeller shaft usually comprises two shaft portions, with the first shaft portion being connected to the gearbox output of the front drive unit, with the outer end being held by an intermediate bearing. The second shaft portion, at one end, is connected to the drive input of the rear axle drive and by means of a joint it is connected to the first shaft portion in the region of the intermediate bearing. Normally, universal joints are arranged at the ends of the propeller shaft, i.e. toward the gearbox output and the axle drive input. A universal joint can also be provided in the central region. However, it is also known to use a constant velocity plunging joint in this central region, as described, for example, in the book by Prof. Dip.-Ing. Jörnsen Reimpell: Fahrwerktechnik 1, $5^{th}$ edition, Vogel-Verlag, p. 285, FIG. 3.1/21.

DE 40 31 820 C2 describes a constant velocity fixed joint whose outer part comprises a first and a second open end. It comprises a cavity which is centered on the longitudinal outer part axis. The first outer running grooves start from the first open end and extend towards the second open end. The second outer running grooves start from the second open end and extend towards the first open end.

All outer running grooves extend in a curve-like and undercut-free way from the respective end from which they start. In the cavity of the outer part, there is arranged an inner part. The inner part comprises a longitudinal inner part axis and a spherical outer face provided with first and second inner running grooves which are positioned opposite the first and second outer running grooves and, with reference to the inner part axis, extend in meridian planes.

The first inner running grooves are arranged opposite the first outer grooves, while starting from the first open end, extending towards the second open end in a curve-like and undercut-free way. The second inner running grooves are arranged opposite the second outer running grooves, which, together, form pairs, with the second inner running grooves starting from the second open end and extending curve-like and in an undercut-free way towards the first open end. Between the inner face of the outer part and the spherical outer face of the inner part, there is arranged a cage whose spherical outer face is arranged with play relative to the inner face of the outer part. The cage comprises a cylindrical bore which is held with play relative to the spherical outer face of the inner part. The cage is provided with radial apertures which are arranged in accordance with the pairs of inner running grooves and outer running grooves, which form windows and guide the balls between the lateral guiding faces. For the purpose of transmitting torque, the balls engage between the outer part and inner part into the outer running grooves and inner running grooves associated with pairs. The centers of all balls are held in one plane which contains the window centers between the lateral guiding faces. The cage is centered by the balls only. In constant velocity joints rotating at high speeds such as they are used for example in the propeller shaft for transmitting a rotational movement in passenger cars from its front drive unit to the rear axle drive in rear wheel drive vehicles, such a design is disadvantageous. There occur vibrations because the center of gravity of the cage is displaced, so that the centrifugal force comes into effect.

In such joints, under torque conditions, the forces applied by the pairs of running grooves extending in opposite directions to the balls are accommodated by the cage. In the process, smooth and low-friction running conditions may be interfered with by external forces in that there occurs an axial displacement of the inner part and outer part. The cage is additionally loaded by such forces on one side, thus causing out-of-balance. The cage is subject to higher forces.

SUMMARY OF THE INVENTION

It is an object of the invention to provide a drive assembly which is particularly suitable for being used in motor vehicle drivelines rotating at high speeds, which is characterized by low friction losses and whose components, especially the cage of the constant velocity fixed joint, is subjected to lower loads.

In accordance with the invention, the objective is achieved in that there is provided a drive assembly comprising at least one constant velocity fixed joint. The joint comprises a hollow outer part, an inner part with an outer face received in the outer part, a cage arranged between the outer part and the inner part and balls which are held by the cage in a common plane. The balls engage running grooves in an inner face of the hollow outer part and in the outer face of the inner part for the transmission of torque between the outer part and the inner part. The constant velocity fixed joint permits only angular movements between the outer part and the inner part relative to one another around an articulation center.

The joint also includes rolling contact member guiding means which permit the transmission of torque in the case of a setting movement along a setting axis and, for this purpose, are provide with a plunging journal with inner grooves extending in its outer face parallel to the setting axis. A plunging sleeve with a bore which is adjustably entered by the plunging journal along the setting axis and in which there are provided outer grooves positioned opposite the inner grooves and extending parallel to the setting axis is also included. Guiding balls are rollingly received in the respective opposed inner grooves and outer grooves. A guiding cage holds the guiding balls. The outer part includes a first open end and a second open end, a longitudinal outer part axis, a cavity which is centered on the longitudinal outer part axis and which is open towards both open ends, and first outer running grooves and second outer running grooves in its inner face delimiting the cavity. The first outer running grooves and second outer running grooves are arranged in a regular sequence around the longitudinal outer part axis in planes which contain the longitudinal outer part axis. Furthermore, the first outer running grooves, while starting from the first open end, extend towards the second open end in a curve-like and undercut-free way. The second outer running grooves, while starting from the second open end, extend towards the first open end in a curve-like and undercut-free way. The inner part is arranged in the cavity of the outer part having a longitudinal inner part axis, a spherical outer face and first inner running grooves and second inner running grooves arranged in the spherical outer face and extending in planes which are distributed around the longitudinal inner part axis and contain same. Each of the first inner running grooves is arranged opposite a first outer running groove and, while starting from the first open end, extend towards the second open end in a curve-like and undercut-free way. Each of the second inner running grooves is arranged opposite a second outer running groove and, while starting from the second open end, extending towards the first open end in a curve-like and undercut-free way. The cage comprises an inner face which is centered on the longitudinal cage axis and is provided with continuous, hollow-spherical portions, by means of which inner face the cage is guided on the spherical outer face of the inner part, and with the outer face of the cage being arranged at a distance from the inner face of the outer part.

The rolling contact member guides prevent the introduction of forces which could interfere with the functioning of the constant velocity fixed joint. Rolling contact member guide leads to a plunging bearing with a friction coefficient of 0.003 to 0.004. The design of the constant velocity fixed joint permits the use of smaller balls to keep the centrifugal force as low as possible, because with small balls, self-excitation of the constant velocity fixed joint can be kept at a low level, even at high rotational speeds.

Furthermore, the track shape permits a radially play-free support. In particular, this is achieved in that the components, i.e. the inner part and the outer part of the constant velocity fixed joint, are produced in a non-chip forming way. This method permits a high degree of repeat accuracy as regards the inner and outer running grooves. In consequence, even at high rotational speed such as they occur in the propeller shaft of a motor vehicle driveline, smooth running characteristics are achieved without the need for substantial balancing measures.

The inventive constant velocity fixed joints whose tracks extend in opposite directions ensure advantageous centering conditions. In addition, even at greater articulation angles, the track shape ensures a long service life which is more limited in the constant velocity joints currently used in propeller shafts. The contact between the cage and the outer face of the inner part prevents the cage from being displaced, so that smooth running is ensured even at high rotational speeds. Even external forces acting on the assembly do not affect the cage because the rolling contact member guide prevent such external forces from being transmitted to the constant velocity fixed joint and its components.

To permit the required articulation of the cage even in the case of greater articulation angles, it is proposed furthermore that the cage comprises an outer face which is at least partially delimited by a sphere in the form of an envelope curve, as well as windows which extend radially in accordance with the parts of inner running grooves and outer running grooves and which are provided with lateral guiding faces for the balls.

In order to ensure advantageous guiding conditions for the balls, even at large articulation angles, it is proposed that the cage is provided with lugs which increase the size of the two lateral guiding faces and which project beyond the outer face of the cage.

Furthermore, axial assembly of the cage can be achieved in that the cage is provided with assembly grooves which are arranged inside, in the region of the windows, which start at least from one end face and end in the windows.

In this way, it is possible to achieve a plug-in type of assembly, the balls of all tracks which are open towards one end can initially be prefitted and then, together with the cage and the inner part, they can be introduced into the outer part.

An advantageous method of producing the outer part can be achieved if, across its length and its circumference, the outer part comprises a substantially uniform wall thickness. To achieve this, it can be produced from a plate metal sheet or from a tube by a non-chip forming method. This method requires low deformation forces, so that it is possible to produce outer running grooves with a high degree of repeat accuracy. This also favors smooth running because any deviations from the ideal track shape are largely eliminated. To connect the outer part to a driving or driven component it is proposed that, at one end of its portion comprising the first and second outer running grooves, it is provided with a flange which extends away from the longitudinal outer part axis. This can be formed on to the outer part during the deformation process.

Furthermore, smooth running and the load bearing capacity of the joint are advantageously affected if, in the outer part, there are alternately arranged a first outer running groove and a second outer running groove around the longitudinal outer part axis. Accordingly, in the inner part, there are alternately arranged a first inner running groove and a second inner running groove around the longitudinal inner part axis. Smooth running can be improved further wherein the first and the second outer running grooves and the first and second inner running grooves each comprise a cross-section which is designed in such a way that, at least in the torque-free condition, each ball received by a pair of outer and inner running grooves contacts the flanks of the associated outer running groove and inner running groove in two points. In total, there is thus achieved support in four points.

As regards the torque transmitting capacity at a large articulation angle, it is advantageous to provide an assembly wherein there is provided an uneven number of first and second outer running grooves and first and second inner running grooves and wherein the first and second outer running grooves and the first and second inner running grooves are alternately arranged on the circumference.

As the balls in the circumferential direction around the longitudinal axis of the cage carry out only slight movements relative to the guiding faces, it is possible for the lugs to extend over part of the length of the guiding faces in the circumferential direction of the cage. The outer lugs are arranged in the region of the outer running grooves, so that they do not interfere with an articulation of the cage relative to the outer part.

BRIEF DESCRIPTION OF THE DRAWINGS

A preferred embodiment of the inventive drive assembly is diagrammatically illustrated in the drawings wherein:

FIG. 3 shows the cage in the form of a detail in an longitudinal section along sectional line III—III of FIG. 4.

FIG. 4 is a side view relative to FIG. 3 in a section along sectional line IV—IV of FIG. 3.

FIG. 5 is a plan view of the cage with reference to the portion containing a window in the direction of arrow X of FIG. 6, in an enlarged scale relative to FIGS. 3 and 4.

FIG. 6 shows a section VI—VI of FIG. 5 in an enlarged scale relative to FIGS. 3 and 4.

DETAILED DESCRIPTION OF A PREFERRED EMBODIMENT

The inventive drive assembly comprises a constant velocity fixed joint A which will be described below in greater detail with reference to FIGS. 1 to 6. It further comprises rolling contact member guide B which, thereafter, will be described with reference to FIG. 1.

Figure 1:
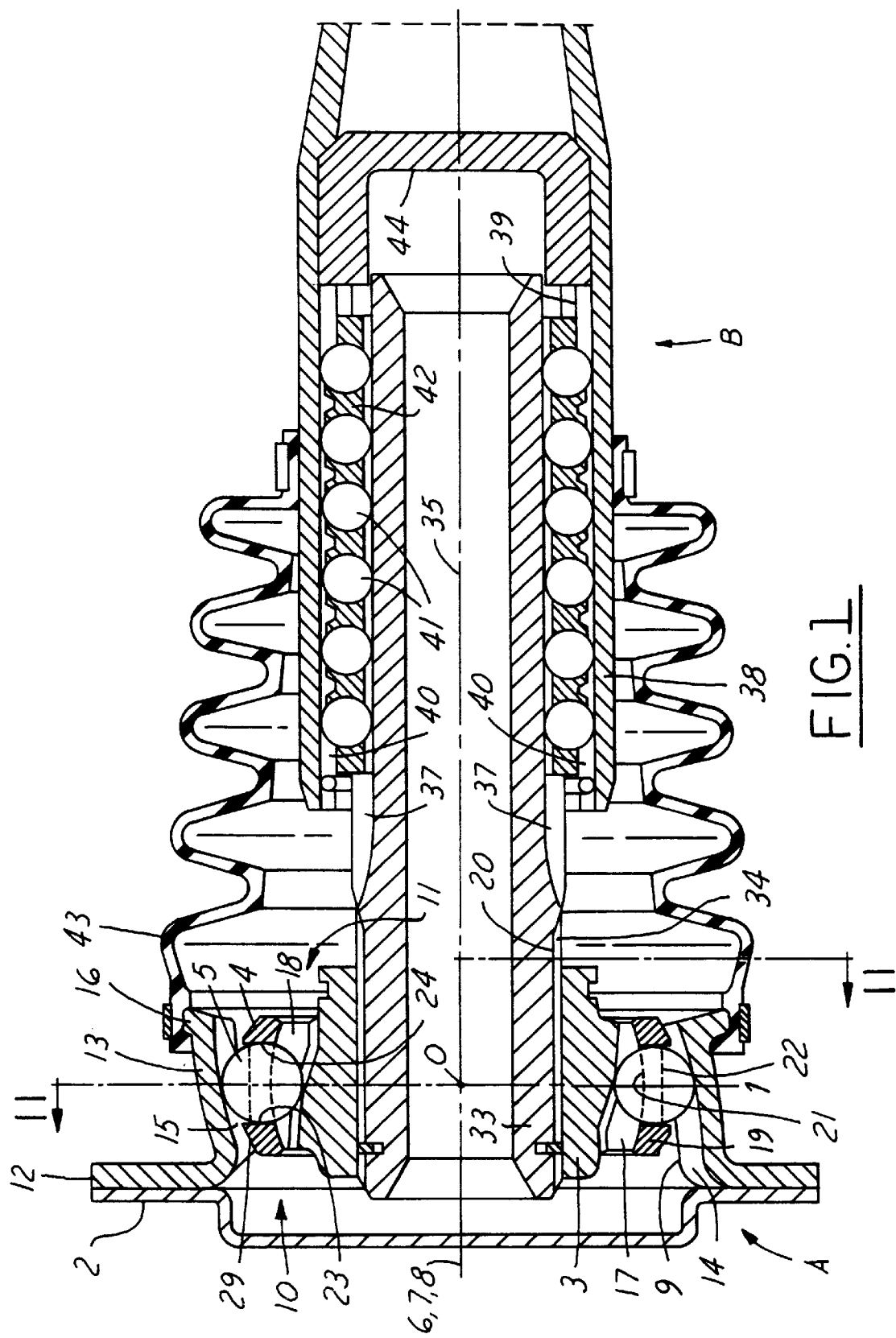
FIG. 1 is a longitudinal section through one embodiment of the drive assembly according to the present invention, with the section through the constant velocity fixed joint extending along sectional line I—I of FIG. 2.
Figure 2:
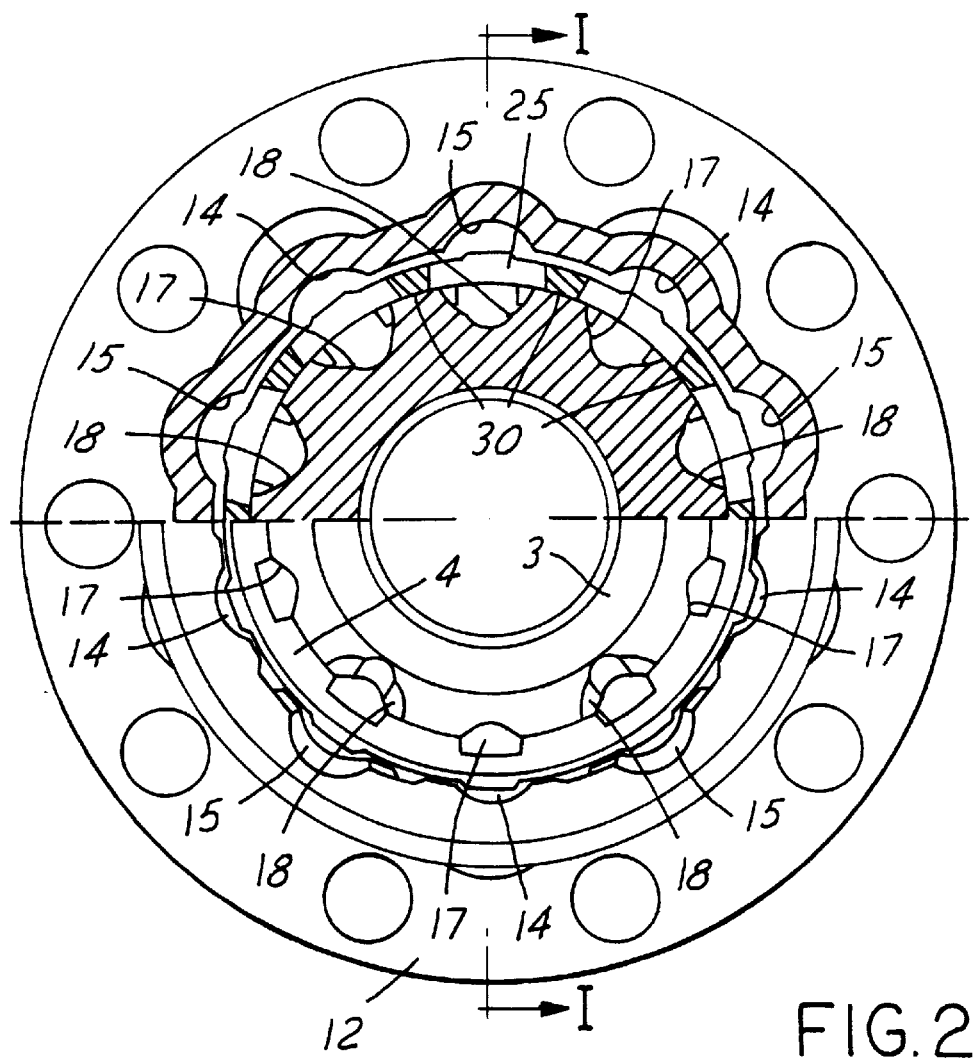
FIG. 2 shows the constant velocity fixed joint without the plunging journal, half in the form of a side view and half as a sectioned side view along sectional line II—II of FIG. 1.
Figure 2A:
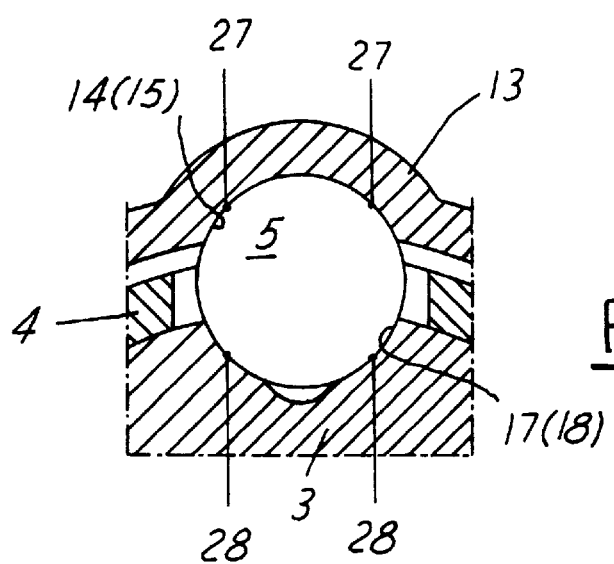
FIG. 2a shows a detail regarding the contact of a ball in an associated outer running groove and inner running groove, in an enlarged scale as compared to FIG. 2.

First, FIGS. 1, 2 and 2a will be described jointly. Said figures show a constant velocity fixed joint A having an outer part 1. A cover 2 closes the outer part 1 at one end. An inner part 3 is received in a cavity of the outer part 1. A cage 4 which is arranged between the outer part 1 and the inner part 3 holds the balls 5 which serve to transmit torque between the outer part 1 and the inner part 2. The components of the constant velocity fixed joint A are shown in continuous lines in the aligned position, so that the longitudinal outer part axis 6, the longitudinal inner part axis 7 and the longitudinal cage axis 8 coincide.

In such constant velocity joint, the balls 5 are guided into the angle-bisecting plane, while being held by the cage 4. The outer part 1 comprises a continuous cavity having two open ends, i.e. a first open end 10 and a second open end 11. In the region between the two open ends, 10, 11, the inner face of the outer part 1 has been given the reference number 9. It can also be seen that the outer part 1 is provided with a flange 12 which, while starting from the portion 13, extends outwardly away from the longitudinal outer part axis 6 and is provided at the first open end 10. Said open end 10 is closed by the cover 2 which also comprises a flange-like portion which rests against the flange 12. Furthermore, the flange 12 comprises fixing bores which are circumferentially distributed around the longitudinal outer part axis 6 and which serve to fix the outer part 1 to a driving or driven component.

In the inner face 9 of the outer part 1, there are provided two sets of outer running grooves 14, 15, with the first outer running grooves 14, while starting from the first open end 10, extending in planes which are distributed around the longitudinal outer part axis 6 and contain same. The first outer running grooves 14, while starting from the first open end 10, extend toward the second open end 11 in a curve-like and undercut-free way, so that their track bases progressively approach the longitudinal outer part axis 6. The second outer running grooves 15 are also arranged in planes which are distributed around the longitudinal outer part axis 6 and contain same. They start from the second open end 11 and extend towards the first open end 10 in a curve-like and undercut-free way, so that they progressively approach the longitudinal outer part axis 6.

There are provided five first outer running grooves 14 and five second outer running grooves 15, so that, in the outer part, one first outer running groove 14 and one second outer running each are arranged diametrically relative to one another. The outer part 1 is produced from a plate metal sheet or tube and it comprises a wall thickness which is substantially uniform around the circumference.

Furthermore, in the region of the second open end 11, the wall of the outer part 1 has been formed into a collar 16 which has a stiffening effect. At the other end, i.e. in the region of the first end 10, the flange 12 has a corresponding stiffening effect.

In the cavity of the outer part 1, the inner part 3, with its longitudinal inner part axis 7, is received concentrically relative to the longitudinal outer part axis 6. The inner part 3, in its outer face 19 which is provided in the form of a spherical face with reference to the articulation center 0, is provided with circumferentially alternately arranged first inner running grooves 17 and second inner running grooves 18 which are arranged in planes distributed around the longitudinal inner part axis 7 and contain same. The first inner running grooves 17 start from the first open end 10 and extend in a curve-like and undercut-free way in said planes with reference to the longitudinal inner part axis 7 towards the second open end 11, with an increasing distance between their track bases and the longitudinal inner part axis 7. The second inner running grooves 18, while starting from the second open end 11, extend in planes distributed around the longitudinal inner part axis 7 and contain same, towards the first open end 10 in a curve-like and undercut-free way, so that their track bases extend towards the other open end and move away from the associated longitudinal inner part axis 7.

Always one first outer running groove 14 is arranged opposite a first inner running groove 17, so that they form pairs and comprise a cross-section which opens towards the first open end. Always a second outer running groove 15 and a second inner running groove 18 are arranged opposite one another and form a cross-section which opens towards the second open end 11. Furthermore, the inner part 3 comprises an attaching bore 20 which is centered on the longitudinal inner part axis 7 and into which a connecting shaft can be inserted. For this purpose the attaching bore 20 is provided with toothing.

The space between the inner face 9 of the outer part 1 and the spherical outer face 19 of the inner part 3 receives the cage 4. The cage 4 comprises an inner face 21 with a hollow-spherical portion by means of which the outer cage 4 is guided on the portions of the spherical outer face 19, which portions are located between two adjoining first and second inner running grooves 17, 18. The cage 4 is provided with apertures which are arranged in accordance with the pairs of first outer running grooves 14 and first inner running grooves 17 as well as the pairs of second outer running grooves 15 and second inner running grove 18. The apertures extend from the inner face 21 of the cage 4 to its outer face 22 and form windows 25 for receiving balls 5.

The balls 5 are guided between the lateral guiding faces 23, 24 of the windows 25 of the cage 4. The guiding faces are offset towards the longitudinal cage axis 8. The balls 5 project outwardly into the associated first outer running groove 14 and second outer running groove 15 and inwardly for the purpose of engaging a first inner running groove 17 and a second inner running groove 18 respectively.

Both types of outer running grooves 14, 15 and inner running grooves 17, 18 also comprise a cross-section which deviates from the circular cross-section, as a result of which there occur, at the flanks, two points of contact 27, 28 each with the associated balls 5. A ball 5 received between an outer running groove and an inner running groove is guided, as a result of contact in four points 27, 28, by the associated running grooves into the angle-bisecting plane. This is due to the curve-like path taken by said grooves towards the longitudinal outer part axis 6 and inner part axis 7. As a result, the outer part 1 pivots relative to the inner part 3 at the same time as the cage 4 pivots relative to the inner part 3 around a common articulation center 0.

Only angular movements are possible because the cage 4 is only pivotable relative to the inner part 3, so that a constant velocity fixed joint is obtained.

Both the first outer running grooves 14 and the second outer running grooves 15 can be produced in one tool by a non-chip forming method, starting from opposite ends. This also applies to the inner part with the first inner running grooves 17 and the second inner running grooves 18, but the inner part is a solid part. To improve the guiding conditions for the balls 5 in the windows 25, the cage has a special design which will be described below with reference to FIGS. 3 to 6.

For the purpose of increasing the length of the lateral guiding faces 23, 24 which, centrally between them, define a central plane 26 which contains the centers of all the balls 5 received in the cage 4, the cage is provided with lugs 29 which project outwardly beyond the outer face 22.

Furthermore, in its inner face 21, the cage 4 comprises a groove 36 which is located in the region of the windows 25. The groove 36 is centered on the central plane 26 and frees the cage 4 relative to the spherical outer face of the inner part. The outer lugs 29 extend only over a short distance of the cage windows 25 in the circumferential direction around the longitudinal cage axis 8.

To facilitate the assembly of the inner part 3 and the cage 4, the cage 4 is provided with assembly grooves 32, 32' which are located in the inner cage face in the region of the windows 25. The assembly grooves 32, 32 extend parallel to the longitudinal cage axis 8, which start from the end faces of the cage 4 and end in the region of the windows 25. Between two diametrically opposed assembly grooves 32, 32', there is provided a passage D whose diameter is greater than the diameter of the spherical outer face of the inner part. The width of the assembly grooves 32, 32' is greater than the width of the webs between two adjoining inner running grooves of the inner part. Although, for assembly purposes, assembly grooves 32 or 32' are required to start from one end face of the cage 4 only, the invention proposes a symmetric arrangement in order to avoid distortion during the cage hardening operation. The outer face cage 4, on its outside, in addition to the projecting outer lugs 29, comprises a spherical outer portion 31 whose center is centered in the point of intersection between the central plane 26 and the longitudinal cage axis 8. The same applies to the hollow spherical portions 30.

The rolling contact member guide B comprises a plunging journal 33 which comprises a portion 34 provided with toothing by means of which it is inserted into toothed attaching bore of the inner part 3 and prevented from being extracted by a securing ring. The outer face of the plunging journal 33 comprises a plurality of circumferentially distributed inner grooves 37 which extend parallel to the setting axis 35. The setting axis 35 of the plunging journal 33 is identical with the longitudinal inner part axis 7 of the inner part 3 connected to the plunging journal 33. The plunging journal 33 is inserted into a bore 39 of the plunging sleeve 38. The plunging sleeve 38, in the bore 39, comprises outer grooves 40 which are circumferentially distributed in accordance with the inner grooves 37 of the plunging journal 33 and are arranged opposite thereto. The outer grooves 40 extend parallel to the setting axis 35. One pair of opposed inner grooves 37 and outer grooves 40 accommodates a plurality of guiding balls 41 which are arranged therein one behind the other and serve to transmit torque between the plunging journal 33 and the plunging sleeve 38. The guiding balls 41 are all held in a guiding cage 42. When the plunging journal 33 is displaced relative to the sliding sleeve 38, the balls, accordingly, roll in the inner grooves 37 and the outer grooves 40. The setting movement takes place along the setting axis 35.

For sealing the free space between the outer part 1 of the constant velocity fixed joint A and the plunging sleeve 38 of the rolling contact member guide B, there is provided a convoluted boot 43 whose one end is secured to the outer part 1 and or plate metal cap connected thereto and whose other end is secured on the outer face of the plunging sleeve 38. The bore 39 is closed by the plug 44 which, at the same time, serves as a stop for the guiding cage 42.

What is claimed is:
1. A drive assembly comprising:
   at least one constant velocity fixed joint (A) comprising:
   a hollow outer part (1);
   an inner part (3) with a spherical outer face (19) received in the outer part (1);
   a cage (4) arranged between the outer part (1) and the inner part (3); and
   a plurality of balls (5) which are held by the cage (4) in a common plane (26) and which engage running grooves (14, 15, 17, 18) in an inner face (9) of the hollow outer part (1) and in the spherical outer face (19) of the inner part (3) for the transmission of torque between the outer part (1) and the inner part (3), said constant velocity fixed joint (A) permitting only angular movements between the outer part (1) and the inner part (3) relative to one another around an articulation center (0);

a rolling contact member guide (B) which permits the transmission of torque in the case of a setting movement along a setting axis (35) comprising:

a plunging journal (33) with inner grooves (37) extending in its outer face (36) parallel to the setting axis (35);

a plunging sleeve (38) with a bore (39) which is adjustably entered by the plunging journal (33) along the setting axis (35) and in which there are provided outer grooves (40) positioned opposite the inner grooves (37) and extending parallel to the setting axis (35);

a plurality of guiding balls (41) which are rollingly received in the respective opposed inner grooves (37) and outer grooves (40); and a guiding cage (42) which holds the guiding balls (41);

wherein the outer part (1) includes a first open end (10) and a second open end (11), a longitudinal outer part axis (6), a cavity which is centered on the longitudinal outer part axis (6) and which is open towards both open ends (10, 11), and first outer running grooves (14) and second outer running grooves (15) in its inner face (9) delimiting the cavity, with the first outer running grooves (14) and second outer running grooves (15) being arranged in a regular sequence around the longitudinal outer part axis (6), and furthermore, the first outer running grooves (14), while starting from the first open end (10), extending toward the second open end (11) in a curve-like and undercut-free way and the second outer running grooves (15), while starting from the second open end (11), extending towards the first open end (10) in a curve-like and undercut-free way;

wherein, further, the inner part (3) arranged in the cavity of the outer part (1) comprises a longitudinal inner part axis (7), first inner running grooves (17) and second inner running grooves (18) arranged in the spherical outer face (19) and extending in planes which are distributed around the longitudinal inner part axis (7) and contain same, with each of the first inner running grooves (17) being arranged opposite a first outer running groove (14) and, while starting from the first open end (10), extending towards the second open end (11) in a curve-like and undercut-free way and with each of the second inner running grooves (18) being arranged opposite a second outer running groove (15) and, while starting from the second open end (11), extending towards the first open end (10) in a curve-like and undercut-free way, and furthermore, wherein the cage (4) comprises an inner face (21) which is centered on the longitudinal cage axis (8) and is provided with continuous, hollow-spherical portions (30), by means of which inner face (21) of the cage (4) is guided on the spherical outer face (19) of the inner part (3), and with the outer face (22) of the cage (4) being arranged at a distance from the inner face (9) of the outer part (1).

2. A drive assembly according to claim 1, wherein the cage (4) comprises an outer face (22), as well as windows (25) which extend radially in accordance with the pairs of inner running grooves (17, 18) and outer running grooves (14, 15) and which are provided with lateral guiding faces (23, 24) for the balls (5).

3. A drive assembly according to claim 2, wherein the cage (4) is provided with lugs (29) which increase the size of the two lateral guiding faces (23, 24) and project beyond the outer face (22) of the cage (4).

4. A drive assembly according to claim 3, wherein the outer lugs (29) extend over part of the length of the guiding faces (23, 24) in the circumferential direction of the cage (4).

5. A drive assembly according to claim 2, wherein, with the exception of the projecting outer lugs (29), the outer face (22) of the cage (4) is spherical.

6. A drive assembly according to claim 1, wherein the cage (4) is provided with assembly grooves (32, 32') which are arranged inside in the region of the windows (25), which start at least from one end face and end in the windows (25).

7. A drive assembly according to claim 1, wherein across its length and its circumference, the outer part (1) comprises a substantially uniform wall thickness.

8. A drive assembly according to claim 7, wherein at least one end of a portion (13) of the outer part (1) comprising the first and second outer running grooves (14, 15), the outer part (1) is provided with a collar (16) which extends outwardly away from the longitudinal outer part axis (6).

9. A drive assembly according to claim 1, wherein at one end of its portion (13) comprising the first and second outer running grooves (14, 15), the outer part (1) is provided with a flange (12) which extends away from the longitudinal outer part axis (6).

10. A drive assembly according to claim 1, wherein in the outer part (1), the first outer running grooves (14) and the second outer running grooves (15) are alternately arranged around the longitudinal outer part axis (6), and that, in the inner part (3), the first inner running grooves (17) and the second inner running grooves (18) are alternately arranged around the longitudinal inner part axis (7).

11. A drive assembly according to claim 1, wherein the first and the second outer running grooves (14, 15) and the first and the second inner running grooves (17, 18) each comprise a cross-section which is designed in such a way that, at least in the torque-free condition, each ball (5) received by a pair of outer and inner running grooves (14, 17; 15, 18) contacts the flanks of the associated outer running groove (14, 15) and inner running groove (17, 18) in two points (27, 28).

12. A drive assembly according to claim 1, wherein there is provided an uneven number of each of the first and second outer running grooves (14, 15) and each of the first and second inner running grooves (17, 18) respectively and that the first and the second outer running grooves and the first and the second inner running grooves (17, 18) are arranged in an alternating sequence.

* * * * *